(12) United States Patent
Hays

(10) Patent No.: US 6,488,759 B1
(45) Date of Patent: Dec. 3, 2002

(54) STRONG MONOARYLIDE PIGMENT/HYDROCARBYL POLYPROPYLENEAMINE COMPOSITIONS

(75) Inventor: Byron G. Hays, Chagrin Falls, OH (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/940,387

(22) Filed: Aug. 27, 2001

(51) Int. Cl.⁷ .................. C09B 29/01; C09B 29/00; C09B 39/00
(52) U.S. Cl. .............. 106/496; 106/493; 106/499; 106/31.75; 106/31.8; 524/190
(58) Field of Search ................ 106/493, 496, 106/499, 31.75, 31.8; 524/190

(56) References Cited

U.S. PATENT DOCUMENTS

| 4,462,833 A | | 7/1984 | Hays et al. ............. 106/23 |
|---|---|---|---|
| 4,468,255 A | * | 8/1984 | Schwartz et al. ......... 106/494 |
| 4,537,721 A | | 8/1985 | Groll et al. ............. 260/242.2 |
| 4,885,033 A | | 12/1989 | Blackburn et al. ......... 106/494 |
| 5,145,997 A | | 9/1992 | Schwartz et al. .......... 564/158 |
| 5,382,288 A | * | 1/1995 | Schenk et al. ............ 106/31.8 |
| 5,529,621 A | | 6/1996 | Hudson et al. ............ 106/278 |
| 5,672,202 A | | 9/1997 | Stirling et al. ........... 106/496 |
| 6,136,082 A | | 10/2000 | Barreto et al. ............ 106/277 |

FOREIGN PATENT DOCUMENTS

| DE | 2526872 | | 1/1976 | ........... C09B/29/06 |
|---|---|---|---|---|
| EP | 137630 | * | 8/1983 | |
| EP | 0062304 | | 10/1984 | ........... C09B/67/20 |
| EP | 0567918 A2 | | 4/1993 | ........... C09B/67/20 |

* cited by examiner

Primary Examiner—Anthony J. Green
(74) Attorney, Agent, or Firm—Raymond F. Keller

(57) ABSTRACT

One aspect of the invention relates to pigment composition containing a monoarylide pigment and a hydrocarbyl polypropyleneamine compound. Another aspect of the invention relates to making an monoarylide pigment involving coupling a substituted or unsubstituted acetoacetanilide with at least one diazotized aromatic amine in a solution containing a hydrocarbyl polypropyleneamine. Yet another aspect of the invention relates to paint, ink, electrostatic toner, powder coating, and paper compositions containing the pigment composition or monoarylide pigment made in accordance with the invention.

24 Claims, No Drawings

STRONG MONOARYLIDE PIGMENT/ HYDROCARBYL POLYPROPYLENEAMINE COMPOSITIONS

FIELD OF THE INVENTION

The present invention generally relates to monoarylide pigment compositions. In particular, the present invention relates to monoarylide pigments coupled in the presence of hydrocarbyl polyamines which provide pigment compositions having increased tinctorial strength.

BACKGROUND OF THE INVENTION

Azo pigments are a class of colorants that are relatively strong tinctorially and relatively inexpensive. Azo pigments are generally either monoazo or disazo pigments. Azo pigments can also be classified by the type of coupler used (e.g., acetoacetarylide or arylide, pyrazolone, or 2-naphthol). Monoazo pigments made by coupling into an acetoacetarylide are called monoarylide pigments.

Monoarylide pigments generally show good lightfastness/weathering resistance and are particularly useful as coloring agents for paints. One particular use of reddish yellow monoarylide pigments includes replacement for medium chrome yellow pigments in paints used to make traffic stripes. Although monoarylide pigments are relatively strong tinctorially, they are not as tinctorially strong as diarylide pigments. For example, monoarylide yellow C.I. (Colour Index) P.Y. (Pigment Yellow) 65 is not as tinctorially strong as diarylide yellow C.I. P.Y. 83. W. Herbst and K. Hunger, *Industrial Organic Pigments*, Second Edition, VCH, New York, 1997, p. 228, state: "Tinctorially, however, P.Y. 65 is considerably inferior, which precludes its application in printing inks. Opaque varieties of the slightly more greenish diarylide yellow pigment P.Y. 83, for instance, are more than three times as strong as P.Y. 65, yet provide similar lightfastness."

A patent which describes coupling monoarylide yellow pigments in the presence of monoamine salts, followed by addition of rosin solutions, is German Offenlegungsschrift 2526872 (1976, Ciba-Geigy AG); this process gives pigments with increased dispersibility and transparency in lithographic inks.

Several patents describe coupling diarylide yellow pigments in the presence of amine salts. U.S. Pat. No. 5,672,202 to Stirling et al relates to coupling diarylide yellow C.I. P.Y. 12 in the presence of a long chain aliphatic primary amine and ethylene polyamine, then post-adding (adding after coupling) quaternary ammonium chloride and a long chain aliphatic dipropylenetriamine to improve strength, gloss and transparency. U.S. Pat. No. 5,145,997 to Schwartz et al relates to co-coupling P.Y. 12 with a (acetoacet) derivative of a polyoxyalkylene mono-, di- or tri-amine, which gave gravure inks with less color deterioration than inks containing P.Y. 12 modified with tallowalkyl dipropylenetriamine. U.S. Pat. No. 4,885,033 to Blackburn et al relates to coupling P.Y. 12 in the presence of 2,2'-disulfobenzidine dyes and rosin salts, then mixing it with a P.Y. 13/tallowalkyl propylenediamine mixture to improve rheology and printing properties of inks. European Patent 567,918 (1994, Hoechst AG) relates to coupling P.Y. 12 in the presence of an amide of tallowalkyl propylenediamine and caprolactam along with bis(4-aminocyclohexyl)methane and a long chain aliphatic amine to improve gloss, strength and holdout. European Patent 62,304 (1982, Hoechst AG) relates to coupling diarylide yellows in the presence of a long chain aliphatic amine or a quaternary ammonium chloride phase transfer catalyst, then post-adding a polyethyleneamine to increase strength and gloss. U.S. Pat. No. 4,462,833 to Hays et al relates to post-adding tallowalkyl tripropylenetetramine to P.Y. 12 slurries to increase holdout of publication gravure inks.

SUMMARY OF THE INVENTION

The present invention provides monoarylide pigments with excellent tinctorial strength. Since monoarylide pigments tend to be less expensive and have better lightfastness/weathering resistance than diarylide pigments, increasing the tinctorial strength of monoarylide pigments is a very attractive benefit associated with the present invention.

One aspect of the invention relates to pigment composition containing a monoarylide pigment and a hydrocarbyl polypropyleneamine compound. Another aspect of the invention relates to making an monoarylide pigment involving coupling a substituted or unsubstituted acetoacetanilide with at least one diazotized aromatic amine in a solution containing a hydrocarbyl polypropyleneamine. Yet another aspect of the invention relates to paint, ink, electrostatic toner, powder coating, and paper compositions containing the pigment composition or monoarylide pigment made in accordance with the invention.

DETAILED DESCRIPTION OF THE INVENTION

The present invention relates to a monoarylide pigment made using one or more hydrocarbyl polypropyleneamine compounds. In this connection, monoarylide pigments in accordance with the present invention are made, in part, by coupling a diazotized aromatic amine with a substituted or unsubstituted acetoacetanilide in the presence of at least one hydrocarbyl polypropyleneamine. Pigment compositions contain the monoarylide pigment and the hydrocarbyl polypropyleneamine. Although not limited thereto, monoarylide pigments in accordance with the present invention typically have yellow and/or orange color.

The pigments of the present invention are made using or pigment compositions of the present invention contain a hydrocarbyl polypropyleneamine having Formula (I):

$$RNH(CH_2CH_2CH_2NH)_xH \qquad (I)$$

wherein R is a saturated or unsaturated hydrocarbyl group containing about 10 or more carbon atoms and about 24 or less carbon atoms and x is about 1 or more and about 5 or less. In another embodiment, R is a saturated or unsaturated hydrocarbyl group containing about 12 or more carbon atoms and about 22 or less carbon atoms and x is about 2 or more and about 4 or less. In yet another embodiment, R is a saturated or unsaturated hydrocarbyl group containing about 14 or more carbon atoms and about 20 or less carbon atoms.

As used herein, the term "hydrocarbyl" means that the group being described has predominantly hydrocarbon character within the context of this invention. These include groups that are not only purely hydrocarbon in nature (containing only carbon and hydrogen), but also groups containing substituents or hetero atoms which do not alter the predominantly hydrocarbon character of the group. Such substituents may include halo-, carbonyl-, ester-, ether-, alkoxy-, nitro-, etc. These groups also may contain hetero atoms. Suitable hetero atoms will be apparent to those skilled in the art and include, for example, sulfur, nitrogen and particularly oxygen.

In one embodiment, the hydrocarbyl polypropyleneamine is a saturated alkyl polypropyleneamine, wherein the alkyl group contains about 10 or more carbon atoms and about 24 or less carbon atoms. In another embodiment, the hydrocarbyl polypropyleneamine is an unsaturated alkyl polypropyleneamine, wherein the alkyl group contains about 10 or more carbon atoms and about 24 or less carbon atoms.

General examples of hydrocarbyl polypropyleneamines include stearyl poly(propyleneamine), oleyl poly(propyleneamine), lauryl poly(propyleneamine), decyl poly(propyleneamine), myristyl poly(propyleneamine), palmyl poly(propyleneamine), isodecyl poly(propyleneamine), tallowalkyl poly(propyleneamine), and cocoalkyl poly(propyleneamine).

Specific examples of hydrocarbyl polypropyleneamines include tallowalkyl tetrapropylenepentamine, tallowalkyl tripropylenetetramine, tallowalkyl dipropylenetriamine, cocoalkyl tetrapropylenepentamine, cocoalkyl tripropylenetetramine, cocoalkyl dipropylenetriamine, stearyl tetrapropylenepentamine, stearyl tripropylenetetramine, stearyl dipropylenetriamine, oleyl tetrapropylenepentamine, oleyl tripropylenetetramine, oleyl dipropylenetriamine, lauryl tetrapropylenepentamine, lauryl tripropylenetetramine, lauryl dipropylenetriamine, decyl tetrapropylenepentamine, decyl tripropylenetetramine, decyl dipropylenetriamine, myristyl tetrapropylenepentamine, myristyl tripropylenetetramine, myristyl dipropylenetriamine, palmyl tetrapropylenepentamine, palmyl tripropylenetetramine, palmyl dipropylenetriamine, isodecyl tetrapropylenepentamine, isodecyl tripropylenetetramine, and isodecyl dipropylenetriamine.

Hydrocarbyl polypropyleneamines include those under the trade designation Corsamine available from Corsicana Technologies, Inc., and specifically product designations PNT, TET and TRT; those available from Akzo Nobel Chemicals Inc. under the trade designations Tetrameen T and Triameen T; and those under the trade designation Polyram® available from Ceca S. A.

The hydrocarbyl polypropyleneamines are typically insoluble in water, so they can be made soluble, if necessary, by dissolving in an acidic solutions of acetic acid, hydrochloric acid, sulfuric acid, nitric acid, phosphoric acid, and the like. After coupling (subsequently described), the soluble protonated hydrocarbyl polypropyleneamines may be precipitated on the pigment by addition of a strong base, such as sodium hydroxide, potassium hydroxide, and the like, which promotes flocculation of the pigment dispersion and allows filtration and washing. Monoarylide pigments in accordance with the present invention are represented by compounds having Formula (II):

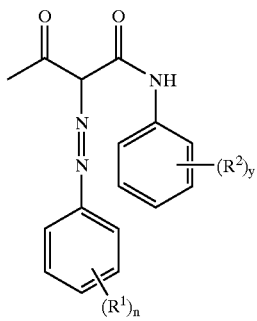

(II)

wherein each $R^1$ and each $R^2$, if any, are independently halogen, an alkyl group having 1 to about 4 carbon atoms, an alkoxy group having 1 to about 4 carbon atoms, an alkoxycarbonyl group having 1 to about 6 carbon atoms, a nitro group, a cyano group, a phenoxy group, or a trifluoromethyl group, and n and y are independently 0 or more and 4 or less. In another embodiment, each $R^1$ and each $R^2$, if any, are independently halogen, an alkyl group having 1 to about 3 carbon atoms, an alkoxy group having 1 to about 3 carbon atoms, a nitro group, and n and y are independently 1 or more and 3 or less. Halogens include fluorine, chlorine and bromine. The monoarylide pigments in accordance with the present invention are made, in part, by coupling a diazotized aromatic amine with a substituted or unsubstituted acetoacetanilide in the presence of at least one hydrocarbyl polypropyleneamine.

Specific examples of monoarylide pigments in accordance with the present invention include P.Y. 3 (wherein a first $R^1$ in the 2-position is nitro, a second $R^1$ in the 4-position is chloro, and an $R^2$ in the 2-position is chloro), P.Y. 65 (wherein a first $R^1$ in the 2-position is nitro, a second $R^1$ in the 4-position is methoxy, and an $R^2$ in the 2-position is methoxy), and P.O. 1 (wherein a first $R^1$ in the 2-position is nitro, a second $R^1$ in the 4-position is methoxy, and an $R^2$ in the 2-position is methyl).

Aromatic amines are compounds generally represented by Formula (III):

(III)

wherein each $R^1$ is independently halogen, an alkyl group having 1 to about 4 carbon atoms, an alkoxy group having 1 to about 4 carbon atoms, an alkoxycarbonyl group having 1 to about 6 carbon atoms, a nitro group, a cyano group, a phenoxy group, or a trifluoromethyl group, and n is 0 or more and 4 or less. In another embodiment, each $R^1$ is independently halogen, an alkyl group having 1 to about 3 carbon atoms, an alkoxy group having 1 to about 3 carbon atoms, a nitro group, and n is 1 or more and 3 or less.

In yet another embodiment, aromatic amines are nitro compounds represented by Formula (IV):

(IV)

wherein each $R^1$ is independently halogen, an alkyl group having 1 to about 4 carbon atoms, an alkoxy group having 1 to about 4 carbon atoms, an alkoxycarbonyl group having 1 to about 6 carbon atoms, a cyano group, a phenoxy group, or a trifluoromethyl group, and n is 0 or more and 3 or less. In another embodiment, each $R^1$ is independently halogen, an alkyl group having 1 to about 3 carbon atoms, an alkoxy group having 1 to about 3 carbon atoms, and n is 1 or more and 2 or less.

Examples of commonly available aromatic amines characterized by Formulae (III) and/or (IV) include 2-methoxy-4-nitroaniline; 2-methoxy-5-nitroaniline; 4-methoxy-2-nitroaniline; 2-amino-4-chloro-5-nitrotoluene; 2-chloro-4-nitroaniline; 2-chloro-5-nitroaniline; 4-chloro-2-nitroaniline; 4-chloro-3-nitroaniline; 5-chloro-2-nitroaniline; 5-chloro-2-methyl-4-nitroaniline; 2-chloro-4-methylaniline; 2-chloro-5-methylaniline; 2-chloro-6-methylaniline 3-chloro-2-methylaniline; 3-chloro-4- methylaniline; 4-chloro-2-methylaniline; 5-chloro-2-methylaniline; 4-chloro-2-methoxy-5-methylaniline; 4-chloro-2,6-dinitroaniline; 6-chloro-2,4-dinitroaniline; 2-chloro-4,6-dimethylaniline; 3-chloro-2,6-diethylaniline; 4-chloro-2,6-dibromoaniline; 2-chloroaniline; 3-chloroaniline; 4-chloroaniline; 5-chloro-2-methoxyaniline; 3-chloro-4-methoxyaniline; aniline; and the like.

Substituted or unsubstituted acetoacetanilides are compounds generally represented by Formula (V):

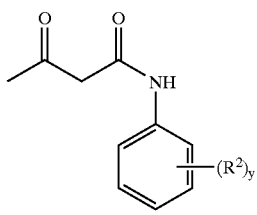

(V)

wherein each $R^2$ is independently halogen, an alkyl group having 1 to about 4 carbon atoms, an alkoxy group having 1 to about 4 carbon atoms, an alkoxycarbonyl group having 1 to about 6 carbon atoms, a nitro group, or a phenoxy group, and y is 0 or more and 4 or less. In another embodiment, each $R^2$ is independently halogen, an alkyl group having 1 to about 3 carbon atoms, an alkoxy group having 1 to about 3 carbon atoms, a nitro group, and y is 1 or more and 3 or less.

Examples of acetoacetanilides include acetoacetanilide, acetoacet-2-methoxyanilide, acetoacet-4-methoxyanilide, acetoacet-2-methylanilide, acetoacet-4-methylanilide, acetoacet-2,4-xylidide, acetoacet-2-chloranilide, acetoacet-2,5-dimethoxy-4-chloranilide, and the like.

The pigments of the present invention may be prepared by initially diazotizing the aromatic amine wherein the aromatic amine forms a diazonium component, and coupling the diazonium component with a coupling component comprised of an acetoacetanilide coupler in the presence of at least one hydrocarbyl polypropyleneamine. The coupling may be conducted in an acidic solution of at least one hydrocarbyl polypropyleneamine.

The aromatic amines from which the diazonium components are prepared are available commercially or can be prepared using methods known in the art. The diazotization of the aromatic amines useful for the purposes of this invention may be carried out in the manners known to those skilled in the art. For example, diazotization may be carried out through the use of alkali metal nitrites or lower alkyl nitrites together with an adequately strong acid such as a mineral acid. Examples of useful mineral acids include hydrochloric acid and sulfuric acid. Nitrosyl sulfuric acid also can be utilized. The diazotization reaction can be conducted at a temperature in the range from about −20° C. to about 30° C., preferably from about 0° C. to about 20° C.

In one embodiment, it is advantageous in the diazotization reactions (and in the subsequent coupling reactions) to include one or more appropriate organic solvents. For example, suitable organic solvents include one or more of glacial acetic acid, lower alkanols, dioxane, formamide, dimethyl formamide, dimethyl sulfoxide, pyridine or N-methyl pyrrolidone. In another embodiment, it is advantageous in the diazotization reactions (and in the subsequent coupling reactions) not to include one or more organic solvents.

The coupling reaction useful for the purposes of the present invention may be effected preferably by adding the diazonium components to the coupling components, but the coupling components can be added to the diazonium components. Coupling is generally effected at a temperature of from about −20° C. to about 80° C., preferably from about 10° C. to about 40° C. As in the diazotization reaction, coupling may be carried out in the presence or absence of an suitable organic solvent, such as all of those identified above in connection with the diazotization reaction.

The coupling reaction solution or slurry generally has an acidic or neutral pH. For example, in one embodiment, the coupling reaction solution has a pH of about 3 or more and about 7 or less. In another embodiment, the coupling reaction solution has a pH of about 4 or more and about 6 or less. In yet another embodiment, the coupling reaction solution has a pH of about 4.25 or more and about 6.5 or less.

In another embodiment, generally, the diazonium components are coupled with a slight stoichiometric excess of the coupling component. That is, one equivalent of the diazonium components (total amount of the diazonium components) is coupled with slightly more than one equivalent of the coupling component. In one embodiment, the ratio of equivalents of the diazonium components to the coupling component is from about 0.9:1 to about 1:1. In another embodiment, the ratio of equivalents of the diazonium components to the coupling component is from about 0.95:1 to about 1:1 and preferably from about 0.98:1 to about 1:1.

In another embodiment of the present invention, the dispersibility of the pigments of the present invention can be improved by adding alkali-soluble resin-like products before, during, or after the coupling is completed. Various resin-like materials can be added for this purpose, and these include for example, rosin resins, polymeric rosins, resin soap, chemically modified rosin resins, such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions. It may also be advantageous to perform the coupling reaction in the presence of a finely divided insoluble material, for example, alkaline earth metal sulfates and carbonates, titanium dioxide or clay materials or very finely divided organic plastic materials.

The coupling reaction of the present invention is conducted in a solution or slurry in the presence of at least one hydrocarbyl polypropyleneamine. In one embodiment, the solution in which coupling occurs contains at least one hydrocarbyl polypropyleneamine in an amount of about 1% by weight or more and about 25% by weight or less based on the weight of the monoarylide pigment. In another embodiment, the solution in which coupling occurs contains at least one hydrocarbyl polypropyleneamine in an amount of about 2.5% by weight or more and about 20% by weight or less based on the weight of the monoarylide pigment. In yet another embodiment, the solution in which coupling occurs contains at least one hydrocarbyl polypropyleneamine in an amount of about 5% by weight or more and about 15% by weight or less based on the weight of the monoarylide pigment.

In most applications, it is desirable, in order to achieve the full brightness and tinctorial strength, to heat the monoarylide pigment. For example, the monoarylide pigment may be heated to boiling temperature for about 0.25 to about 3 hours at temperatures about 100° C. or higher optionally under pressure in the presence or absence of the above-described resin soaps or other soluble resins.

After completion of the reactions and optional heating, the finely divided dispersion of monoarylide pigment and acidic solution of hydrocarbyl polypropyleneamine is flocculated by addition of a strong base to raise the pH to about 10 to about 11; this high pH precipitates the hydrocarbyl polypropyleneamine and changes the fine dispersion to a coarse slurry.

The monoarylide pigments are recovered from the water-based reaction slurry by filtering to form a presscake of pigment which is washed with cold water or hot water (e.g., from about 40° C. to about 70° C.), so as to remove the excess acids, bases and unwanted salts formed during the coupling reaction. The presscake is typically washed with from about 10 to about 20 times its volume of hot water. The filter cake is generally washed until the filtrate gives only a slightly positive test for chloride ion. The washed presscakes can be dried, ground and used in the form of a coarse or finely divided powder. Alternatively, the monoarylide pigments of this invention can be dispersed into oleoresinous vehicles to prepare flushed bases or dispersed into aqueous or organic vehicles to prepare aqueous dispersions or organic pigment compositions.

As stated above, the monoarylide pigments in accordance with the present invention are represented by Formula (II). In another embodiment, monoarylide pigments in accordance with the present invention are compounds represented by Formula (VI)

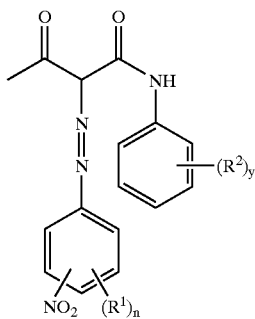

(VI)

wherein each $R^1$ and each $R^2$, if any, are independently halogen, an alkyl group having 1 to about 4 carbon atoms, an alkoxy group having 1 to about 4 carbon atoms, an alkoxycarbonyl group having 1 to about 6 carbon atoms, a nitro group, a cyano group, a phenoxy group, or a trifluoromethyl group, y is 0 or more and 4 or less, and n is 0 or more and 3 or less. In yet another embodiment, each $R^1$ and each $R^2$, if any, are independently halogen, an alkyl group having 1 to about 3 carbon atoms, an alkoxy group having 1 to about 3 carbon atoms, a nitro group, y is 1 or more and 3 or less, and n is 1 or more and 2 or less.

The pigment compositions of this invention contain at least one monoarylide pigment and at least one hydrocarbyl polypropyleneamine. In one embodiment, the pigment compositions contain about 90% by weight or more and about 99.99% by weight or less of at least one monoarylide pigment and about 0.01% by weight or more and about 10% by weight or less of at least one hydrocarbyl polypropyleneamine. In another embodiment, the pigment compositions contain about 95% by weight or more and about 99.9% by weight or less of at least one monoarylide pigment and about 0.1% by weight or more and about 5% by weight or less of at least one hydrocarbyl polypropyleneamine.

The pigment compositions of this invention provide high quality monoarylide pigments having improved color/tinctorial strength, and are useful as coloring agents in paints, inks, electrostatic toners, powder coatings, and papers. This invention, therefore, also relates to paint, ink, electrostatic toner, powder coating, and paper compositions comprising major amounts of a paint vehicle, ink vehicle, electrostatic toner vehicle, powder coating vehicle, and paper vehicle and minor amounts of the monoarylide pigment compositions of this invention. In a preferred embodiment, the invention relates to paints comprising the monoarylide pigment composition. Major amounts include at least 50% by weight whereas minor amounts include less than 50% by weight.

The paint, ink, electrostatic toner, powder coating, and paper compositions in which the pigments of this invention are useful are well known to those of ordinary skill in the art. Examples of inks include printing inks, gravure inks and lacquers. The monoarylide pigment compositions are also useful for pigment printing and for the pigmenting of paper in the mass, electrostatic toners, and powder coatings.

Due to its excellent color/tintorial strength, the monoarylide pigments are particularly suitable for the pigmenting of paints, such as, for example, latex paints, alkyd paints, epoxy paints, oil based paints, road paints (generally for use on asphalt and cement), and the like.

See, for example, with regard to ink: R. H. Leach, editor, *The Printing Ink Manual*, Fourth Edition, Van Nostrand Reinhold (International) Co. Ltd., London (1988), particularly pages 282–591; and with regard to paints: C. H. Hare, *Protective Coatings*, Technology Publishing Co., Pittsburgh (1994), particularly pages 63–288. The foregoing references are hereby incorporated by reference herein for their teachings of ink and paint compositions, formulations and vehicles in which the compositions of this invention may be used including amounts of colorants.

The following examples illustrate the present invention. Unless otherwise indicated in the following examples and elsewhere in the specification and claims, all parts and percentages are by weight, all temperatures are in degrees Centigrade, and pressure is at or near atmospheric pressure.

Comparative Example 1 (P.Y. 65)

A diazo solution is prepared by stirring 16.8 parts of 4-methoxy-2-nitroaniline with 83 parts water and 35.3 parts 200 Baume hydrochloric acid, icing to <0° C., adding 7 parts sodium nitrite dissolved in 21 parts water, stirring the solution at 5–10° C. for 45 minutes, adding sufficient sulfamic acid to eliminate excess nitrous acid and diluting the solution to 300 parts.

A coupler slurry is prepared by dissolving 21.2 parts acetoacet-o-anisidide in a solution of 0.1 part sodium EDTA, 8.4 parts 50% sodium hydroxide and 20.3 parts sodium acetate in 150 parts warm water and reprecipitating it with 6.6 parts glacial acetic acid. The pH of the slurry is adjusted to 6.8 and its temperature is maintained at 28–32° C.

The diazo solution is pumped into the coupler slurry over about 60 minutes, at the end of which time the pH is 4.3 and the slurry shows no excess diazo when tested with R-salt solution. The slurry is adjusted to pH 12 with 50% sodium hydroxide, heated to 100° C., boiled for 30 minutes, iced to less than 60° C. and filtered; the filtercake is washed, dried overnight at 82° C. and pulverized in an Osterizer to give 38.0 parts of reddish-yellow powder.

Example 1 (P.Y. 65)

The procedure of Comparative Example 1 is repeated, except that a solution of 3.86 parts acid tallowalkyl tetrapropylenepentamine dissolved in hot water containing 1.9 parts glacial acetic acid is added to the coupler slurry after reprecipitation, giving 41.6 parts of reddish-yellow powder.

Example 2 (P.Y. 65)

The procedure of Comparative Example 1 is repeated, except that a solution of 3.86 parts acid tallowalkyl tripropylenetetramine dissolved in hot water containing 1.8 parts glacial acetic acid is added to the coupler slurry after reprecipitation, giving 41.8 parts of reddish-yellow powder.

Example 3 (P.Y. 65)

The procedure of Comparative Example 1 is repeated, except that a solution of 3.86 parts tallowalkyl dipropylenetriamine dissolved in hot water containing 1.5 parts glacial acetic is added to the coupler slurry after reprecipitation, giving 41.0 parts of reddish-yellow powder.

Example 4 (P.Y. 65)

The procedure of Comparative Example 1 is repeated, except that a solution of 3.86 parts tallowalkyl propylenediamine dissolved in hot water containing 1.2 parts glacial acetic is added to the coupler slurry after reprecipitation, giving 41.4 parts of reddish-yellow powder.

Comparative Example 2 (P.Y. 3)

A diazo solution is prepared by stirring 17.3 parts of 4-chloro-2-nitroaniline with 83 parts water and 35.3 parts 200 Baume hydrochloric acid, icing to <0° C., adding 7 parts sodium nitrite dissolved in 21 parts water, stirring the solution at 5–10° C. for 45 minutes, adding sufficient sulfamic acid to eliminate excess nitrous acid and diluting the solution to 320 parts.

A coupler slurry is prepared by dissolving 21.2 parts acetoacet-o-chloroanilide in a solution of 0.1 part sodium EDTA, 8.4 parts 50% sodium hydroxide and 20.3 parts sodium acetate in 150 parts warm water and reprecipitating it with 6.6 parts glacial acetic acid. The pH of the slurry is adjusted to 6.8 and its temperature is maintained at 28–32° C.

The diazo solution is pumped into the coupler slurry over about 60 minutes, at the end of which time the pH is 4.5 and the slurry shows no excess diazo when tested with R-salt solution. The slurry is adjusted to pH 12 with 50% sodium hydroxide, heated to 100° C., boiled for 30 minutes, iced to lower than 60° C. and filtered; the filtercake is washed, dried overnight at 82° C. and pulverized in an Osterizer to give 37.0 parts of greenish-yellow powder.

Example 5 (P.Y. 3)

The procedure of Comparative Example 2 is repeated, except that a solution of 3.86 parts tallowalkyl tripropylenetetramine dissolved in hot water containing 1.8 parts glacial acetic acid is added to the coupler slurry after reprecipitation, giving 39.8 parts greenish-yellow powder.

Comparative Example 3 (P.O. 1)

A diazo solution is prepared by stirring 16.8 parts of 4-methoxy-2-nitroaniline with 83 parts water and 35.3 parts 20° Baume hydrochloric acid, icing to <0° C., adding 7 parts sodium nitrite dissolved in 21 parts water, stirring the solution at 5–10° C. for 45 minutes, adding sufficient sulfamic acid to eliminate excess nitrous acid and diluting the solution to 300 parts.

A coupler slurry is prepared by dissolving 19.1 parts acetoacet-o-toluidide in a solution of 0.1 part sodium EDTA, 8.4 parts 50% sodium hydroxide and 20.3 parts sodium acetate in 150 parts warm water and reprecipitating it with 6.6 parts glacial acetic acid. The pH of the slurry is adjusted to 6.8 and its temperature is maintained at 28–32° C.

The diazo solution is pumped into the coupler slurry over about 60 minutes, at the end of which time the pH is 4.2 and the slurry shows no excess diazo when tested with R-salt solution. The slurry is adjusted to pH 12 with 50% sodium hydroxide, heated to 100° C., boiled for 30 minutes, iced to lower than 60° C. and filtered; the filtercake is washed, dried overnight at 82° C. and pulverized in an Osterizer to give 37.6 parts of orange powder.

Example 6 (P.O. 1)

The procedure of Comparative Example 3 is repeated, except that a solution of 3.70 parts tallowalkyl tripropylenetetramine dissolved in hot water containing 1.7 parts glacial acetic acid is added to the coupler slurry after reprecipitation, giving 40.0 parts of orange powder.

Comparative Example 4 (P.O. 6)

A diazo solution is prepared by stirring 15.2 parts of 4-methyl-2-nitroaniline with 70 parts water and 35 parts 20° Baume hydrochloric acid, icing to <0° C., adding 7 parts sodium nitrite dissolved in 21 parts water, stirring the solution at 0–5° C. for 90 minutes, adding sufficient sulfamic acid to eliminate excess nitrous acid and diluting the solution to 300 parts.

A coupler slurry is prepared by mixing 20.9 parts phenyl methyl pyrazolone in a solution of 0.1 part sodium EDTA, 8.4 parts 50% sodium hydroxide, 20.3 parts sodium acetate and 6.6 parts glacial acetic acid in 265 parts warm water. The pH of the slurry is adjusted to 6.8 and its temperature is maintained at 28–32° C.

The diazo solution is pumped into the coupler slurry over about 60 minutes, at the end of which time the pH is 4.3 and the slurry shows no excess diazo when tested with R-salt solution. The slurry is adjusted to pH 12 with 50% sodium hydroxide, heated to 100° C., boiled for 30 minutes, iced to lower than 60° C. and filtered; the filtercake is washed, dried overnight at 82° C. and pulverized in an Osterizer to give 31.6 parts of orange powder.

Comparative Example 5 (P.O. 6)

The procedure of Comparative Example 4 is repeated, except that 19.2 parts phenyl methyl pyrazolone are used and a solution of 3.38 parts tallowalkyl tripropylenetetramine dissolved in hot water containing 1.6 parts glacial acetic acid is added to the coupler slurry, giving 32.8 parts of orange powder.

Comparative Example 6 (P.O. 6)

The procedure of Comparative Example 4 is repeated, except that the orange slurry is not heated after its pH is adjusted to 12, giving 32.8 parts of orange powder.

Comparative Example 7 (P.O. 6)

The procedure of Comparative Example 5 is repeated, except that the orange slurry is not heated after its pH is adjusted to 12, giving 35.2 parts of orange powder.

The pigments are tested as 1:1 tints with titanium dioxide in air-dry alkyd enamel drawdowns as follows: a mixture of 2.5 parts pigment, 2.5 parts titanium dioxide (DuPont Ti-Pure R-960), 23.5 parts air-dry alkyd enamel vehicle (containing 86% medium oil alkyd, 13% mineral spirits and 1% driers/antiskinning agent) and 75 parts media (Zircoa Zirbeads Y1304) is stirred with a spatula to a uniform mixture, sealed with a lid and shaken on a paint shaker for 30 minutes. The dispersion is separated from the media, drawn down with a 0.15 mm. gap coating bar on coated cardboard (Leneta Form 2-C) and allowed to dry for 1–2 days. Spectrophotometric values are measured with a Macbeth Color-Eye (specular component included, large area) to give the apparent strengths and hue angles under Illuminant D, 10 degrees, shown in the Tables.

TABLE I (P.Y. 65)

| Pigment | Apparent Strength | Hue Angle (°) |
| --- | --- | --- |
| Comp. Ex. 1 | Standard (K/S = 25.7) | 66.1 |
| Ex. 1 | +47% | 66.5 |
| Ex. 2 | +47% | 66.1 |
| Ex. 3 | +44% | 66.2 |
| Ex. 4 | +48% | 65.9 |

In Table I, the apparent strengths of P.Y 65 composition in Examples 1 to 4, each coupled in the presence of a solution of a tallowalkyl polypropyleneamine, are substantially higher than the apparent strength of Comparative Example 1, coupled in the absence of a hydrocarbyl polypropyleneamine. The hue angles of Examples 1 to 4 are similar to that for the standard Comparative Example 1 and indicate that the tallowalkyl polypropyleneamine in the P.Y 65 compositions do not shift the hue of the reddish yellow P.Y. 65.

TABLE II (P.Y. 3)

| Pigment | Apparent Strength | Hue Angle (°) |
| --- | --- | --- |
| Comp. Ex. 2 | Standard (K/S = 12.3) | 95.7 |
| Ex. 5 | +54% | 90.5 |

In Table II, the apparent strength of the P.Y 3 composition in Comparative Example 2, coupled in the presence of a solution of a tallowalkyl tripropylenetetramine, is substantially higher than the apparent strength of Comparative Example 2, coupled in the absence of a hydrocarbyl polypropyleneamine. The hue angle of Example 5 is slightly redder than that for the standard Comparative Example 2 and indicates that the tallowalkyl tripropylenetetramine in the P.Y 3 composition shifts the hue of the greenish yellow P.Y. 3 slightly while it markedly increases its apparent strength.

TABLE III (P.O. 1)

| Pigment | Apparent Strength | Hue Angle (°) |
| --- | --- | --- |
| Comp. Ex. 3 | Standard (K/S = 21.7) | 47.8 |
| Ex. 6 | +47% | 59.1 |

In Table III, the apparent strength of the P.O. 1 composition in Example 6, coupled in the presence of a solution of a tallowalkyl tripropylenetetramine, is substantially higher than the apparent strength of Comparative Example 3, coupled in the absence of a hydrocarbyl polypropyleneamine. The hue angle of Example 6 is yellower than that for the standard Comparative Example 3 and indicates that the tallowalkyl tripropylenetetramine in the P.O. 1 composition shifts the hue of the reddish orange P.O. 1 yellower while it markedly increases its apparent strength.

TABLE IV (P.O. 6)

| Pigment | Apparent Strength | Hue Angle (°) |
| --- | --- | --- |
| Comp. Ex. 4 | Standard (K/S = 22.3) | 40.7 |
| Comp. Ex. 5 | −13% | 37.9 |
| Comp. Ex. 6 | Standard (K/S = 23.4) | 41.8 |
| Comp. Ex. 7 | +1% | 42.1 |

Even though the aromatic amine used for P.O. 6 (4-methyl-2-nitroaniline) appears to be structurally similar to those used for P.Y. 65 and P.O. 1 (4-methoxy-2-nitroaniline) and P.Y. 3 (4-chloro-2-nitroaniline), P.O. 6 showed no increase in apparent strength when coupled in the presence of a solution of tallowalkyl tripropylenetetramine. Unlike the monoarylide pigments P.Y. 65, P.O. 1 and P.Y. 3, P.O. 6 is a monopyrazolone pigment made by coupling into phenyl methyl pyrazolone; the tallowalkyl tripropylenetetramine surprisingly does not increase the apparent strength of this monopyrazolone pigment.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A pigment composition comprising:
a major amount of a monoarylide pigment represented by Formula (II)

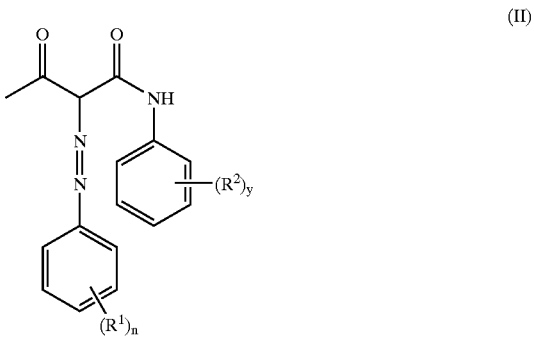

(II)

wherein each $R^1$ and each $R^2$, if any, are independently halogen, an alkyl group having 1 to about 4 carbon atoms, an alkoxy group having 1 to about 4 carbon atoms, an alkoxycarbonyl group having 1 to about 6 carbon atoms, a nitro group, a cyano group, a phenoxy group, or a trifluoromethyl group, and n and y are independently from 0 to 4; and a minor amount of a hydrocarbyl polypropyleneamine represented by Formula (I):

$$RNH(CH_2CH_2CH_2NH)_xH \qquad (I)$$

wherein R is a saturated or unsaturated hydrocarbyl group containing from about 10 carbon atoms to about 24 carbon atoms and x is from about 1 to about 5.

2. The pigment composition of claim 1, composing from about 90% by weight to about 99.99% by weight of the monoarylide pigment and from about 0.01% by weight to about 10% by weight of the hydrocarbyl polypropyleneamine.

3. The pigment composition of claim 1, wherein at least one $R^1$ is a nitro group.

4. The pigment composition of claim 1, wherein the monoarylide pigment is one selected from the group consisting of P.Y. 65, P.Y. 3, and P.O. 1.

5. The pigment composition of claim 1, wherein the hydrocarbyl polypropyleneamine is at least one selected from the group consisting of tallowalkyl tetrapropylenepentamine, tallowalkyl tripropylenetetramine, tallowalkyl dipropylenetriamine, cocoalkyl tetrapropylenepentamine, cocoalkyl tripropylenetetramine, cocoalkyl dipropylenetriamine, stearyl tetrapropylenepentamine, stearyl tripropylenetetramine, stearyl dipropylenetriamine, oleyl tetrapropylenepentamine, oleyl tripropylenetetramine, oleyl dipropylenetriamine, lauryl tetrapropylenepentamine, lauryl tripropylenetetramine, lauryl dipropylenetriamine, decyl tetrapropylenepentamine, decyl tripropylenetetramine, decyl dipropylenetriamine, myristyl tetrapropylenepentamine, myristyl tripropylenetetramine, myristyl dipropylenetriamine, palmyl tetrapropylenepentamine, palmyl tripropylenetetramine, palmyl dipropylenetriamine, isodecyl tetrapropylenepentamine, isodecyl tripropylenetetramine, and isodecyl dipropylenetriamine.

6. A method of making an monoarylide pigment, comprising:

coupling a substituted or unsubstituted acetoacetanilide with at least one diazotized aromatic amine in a solution comprising a minor amount of a hydrocarbyl polypropyleneamine represented by Formula (I):

$$RNH(CH_2CH_2CH_2NH)_xH \qquad (I)$$

wherein R is a saturated or unsaturated hydrocarbyl group containing from about 10 carbon atoms to about 24 carbon atoms and x is from about 1 to about 5.

7. The method of claim 6, wherein the substituted or unsubstituted. acetoacetanilide is represented by Formula (V):

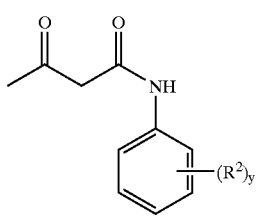

(V)

wherein each $R^2$ is independently halogen, an alkyl group having 1 to about 4 carbon atoms, an alkoxy group having 1 to about 4 carbon atoms, an alkoxycarbonyl group having 1 to about 6 carbon atoms, a nitro group, or a phenoxy group, and y is from 0 to 4.

8. The method of claim 6, wherein the diazotized aromatic amine is made from an aromatic amine represented by Formula (III):

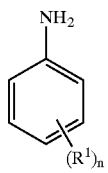

(III)

wherein each $R^1$ is independently halogen, an alkyl group having 1 to about 4 carbon atoms, an alkoxy group having 1 to about 4 carbon atoms, an alkoxycarbonyl group having 1 to about 6 carbon atoms, a nitro group, a cyano group, a phenoxy group, or a trifluoromethyl group, and n is from 0 to 4.

9. The method of claim 6, wherein the solution comprises hydrocarbyl polypropyleneamine in an amount from about 1% by weight to about 25% by weight based on the weight of the monoarylide pigment.

10. The method of claim 6, wherein the solution during coupling has a pH from about 3 to about 7.

11. The method of claim 6, wherein the solution during coupling has a pH from about 4 to about 6.

12. The method of claim 6, wherein the solution during coupling has a temperature from about 10° C. to about 40° C.

13. The method of claim 6, wherein the ratio of equivalents of the diazotized aromatic amine to the substituted or unsubstituted acetoacetanilide is from about 0.9:1 to about 1:1.

14. The method of claim 6, further comprising boiling for a time from about 0.25 to about 3 hours at temperatures of about 100° C. or higher.

15. The method of claim 6, wherein the hydrocarbyl polypropyleneamine is represented by Formula (I):

$$RNH(CH_2CH_2CH_2NH)_xH \qquad (I)$$

wherein R is a saturated or unsaturated hydrocarbyl group containing from about 14 carbon atoms to about 20 carbon atoms and x is from about 2 to about 4.

16. The method of claim 6, wherein the hydrocarbyl polypropyleneamine is at least one selected from the group consisting of stearyl poly(propyleneamine), oleyl poly(propyleneamine), lauryl poly(propyleneamine), decyl poly(propyleneamine), myristyl poly(propyleneamine), palmyl poly(propyleneamine), isodecyl poly(propyleneamine), tallowalkyl poly(propyleneamine), and cocoalkyl poly(propyleneamine).

17. A paint composition, comprising a major amount of a paint vehicle and a minor amount of the pigment composition of claim 1.

18. The paint composition of claim 17, wherein the paint vehicle is one selected from the group consisting of a latex paint, an alkyd paint, an epoxy paint, an oil based paint, and a road paint.

19. A paint composition, comprising a major amount of a paint vehicle and a minor amount of the monoarylide pigment made in accordance with the method of claim 6.

20. The paint composition of claim 19, wherein the paint vehicle is one selected from the group consisting of a latex paint, an alkyd paint, an epoxy paint, an oil based paint, and a road paint.

21. An ink composition, comprising a major amount of an ink vehicle and a minor amount of the pigment composition of claim 1.

22. An ink composition, comprising a major amount of an ink vehicle and a minor amount of the monoarylide pigment made in accordance with the method of claim 6.

23. A paint composition, comprising a major amount of a paint vehicle; and a minor amount of an monoarylide pigment made by coupling a substituted or unsubstituted acetoacetanilide with at least one diazotized aromatic amine in a solution having a pH from about 3 to about 7 comprising a minor amount of a hydrocarbyl polypropyleneamine represented by Formula (I):

$$RNH(CH_2CH_2CH_2NH)_xH \qquad (I)$$

wherein R is a saturated or unsaturated hydrocarbyl group containing from about 10 carbon atoms to about 24 carbon atoms and x is from about 1 to about 4.

24. The paint composition of claim 23, wherein the paint vehicle is one selected from the group consisting of a latex paint, an alkyd paint, an epoxy paint, an oil based paint, and a road paint.

* * * * *